United States Patent Office 2,892,513
Patented June 30, 1959

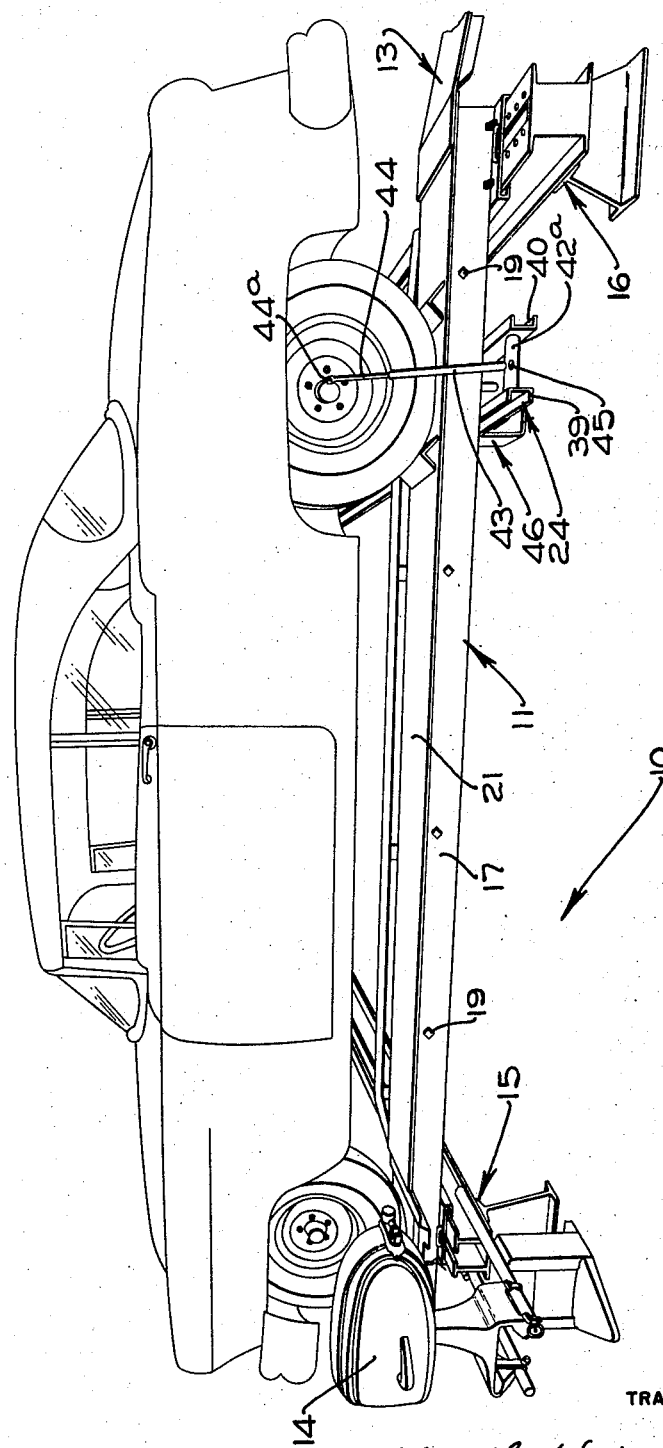

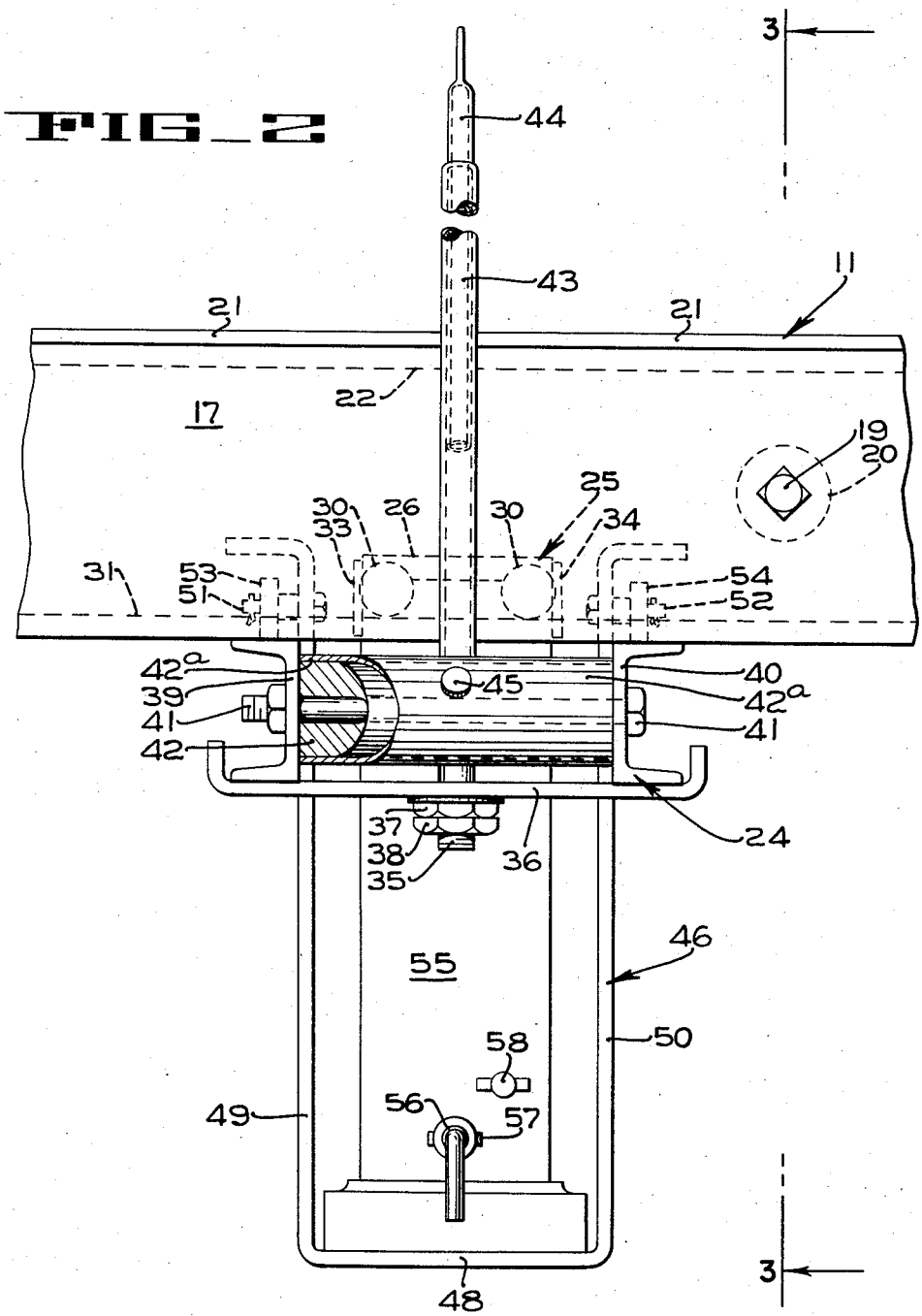

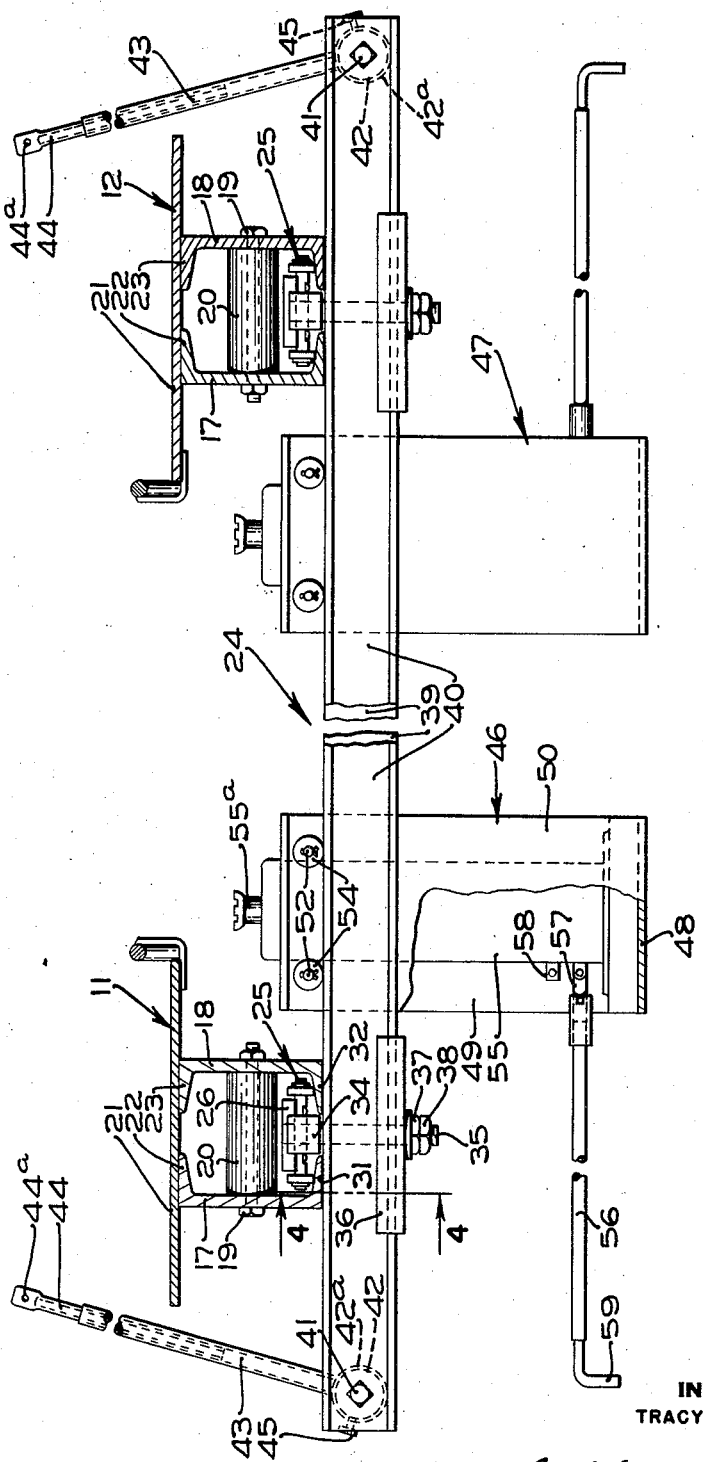

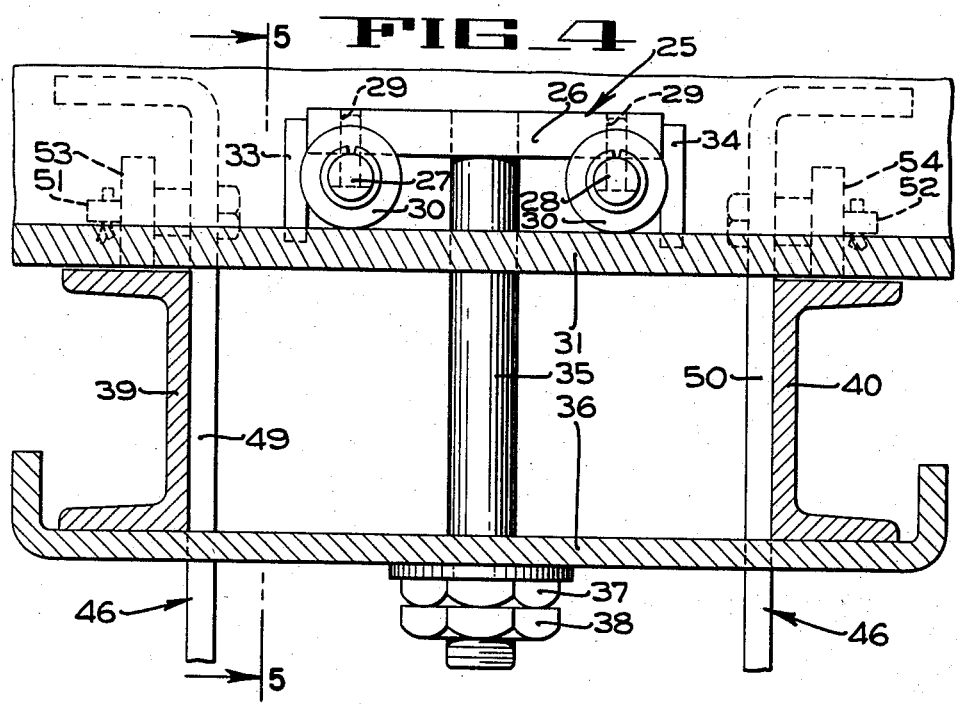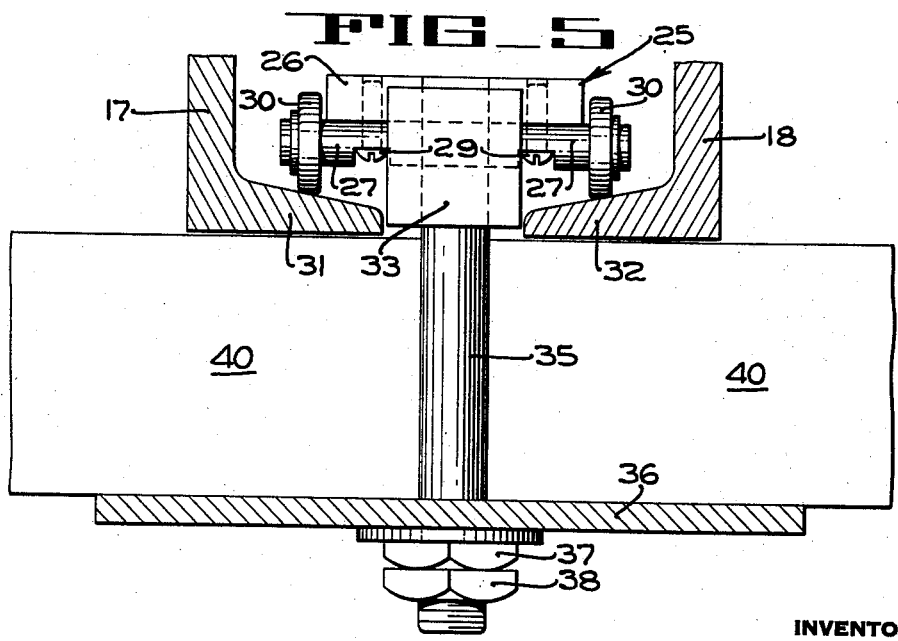
INVENTOR
TRACY CARRIGAN

2,892,513

ADJUSTABLE SUPPORT FOR AN AUTOMOBILE JACK

Tracy Carrigan, Lansing, Mich., assignor to Food Machinery and Chemical Corporation, San Jose, Calif., a corporation of Delaware Application April 16, 1957, Serial No. 653,106

4 Claims. (Cl. 187—8.43)

This invention pertains to improvements in equipment for servicing automotive vehicles and more particularly relates to an adjustable jack support for use in conjunction with the vehicle supporting runways of wheel aligning or similar devices.

In the process of aligning the wheels of an automobile, for example in the manner described in my prior U.S. Patent No. 2,601,262, entitled "Method of and Apparatus for Measuring Alignment Characteristics of Front and Rear Wheels," issued on June 24, 1952, the automobile is customarily driven upon two parallel wheel supporting runways extending normal to a projection screen unit and the various aligning measurements and adjustments are made with the automobile thus disposed. In the course of the above adjustments it is necessary to raise the rear wheels of the vehicle from the runways in order to measure certain characteristics thereof in the manner set forth in said patent. This necessitates the placing of jacks under the rear axle of the vehicle. In view of the various wheel base lengths used in the various makes and models of automobiles, these jacks must be moved and repositioned almost every time a vehicle is driven onto the runways. Also, it has been found desirable, as disclosed in said patent, to be able to move the rear of the vehicle laterally relative to said runways in order to align the axis of the vehicle perpendicularly to the projection screen unit to compensate for any slight misalignment of the vehicle relative to the runways when being driven thereonto.

It is therefore an object of this invention to provide a simple and inexpensive jack support in conjunction with a pair of runways to permit easy and accurate positioning of jacks under the rear axle of a vehicle on said runways regardless of the wheel base of said vehicle.

Another object is to provide a jack support which permits lateral movement of the jacks while a vehicle is supported thereon.

These and other objects and advantages of the present invention will become apparent from the following description and accompanying drawings in which:

Fig. 1 is a perspective view of a device embodying the principles of the invention and shown with typical runway supports and wheel servicing apparatus.

Fig. 2 is a fragmentary side elevation of a portion of the device illustrated in Fig. 1 drawn to an enlarged scale.

Fig. 3 is a section taken generally on line 3—3 of Fig. 2.

Fig. 4 is a section, taken generally on line 4—4 of Fig. 3, which illustrates, at still further enlarged scale, the details of the roller carriage.

Fig. 5 is a section taken generally on line 5—5 of Fig. 4.

A wheel aligner installation 10 comprises two wheel-supporting runways 11 and 12 and two ramps (one of which is shown at 13 Fig. 1) leading up from the floor to the rear ends of said runways. Two optical wheel aligning heads (one shown at 14) are mounted adjacent the forward ends of the runways 11 and 12, respectively, and are adapted to project suitable charts and light beams on a screen (not shown) to indicate the alignment characteristics of the wheels of a vehicle supported on the runways 11 and 12 in the manner fully described in the above-cited Patent No. 2,601,262.

The runways 11 and 12 are supported at their forwardmost and rearmost ends by support structures 15 and 16, respectively. Referring now to Fig. 3, the runways 11 and 12 are identical and each comprises a pair of longitudinally extending inwardly facing channel members 17 and 18 held together by transversely extending bolts 19 which extend through suitable spacer members 20. A flat plate 21 is welded or otherwise fastened to the upper flanges 22 and 23 of the channels 17 and 18, respectively.

The jack support 24 of the present invention is suspended laterally beneath the runways 11 and 12. Since each end of the jack support is suspended by identical structures 25, only the support associated with the runway 11 will be described in detail. Each roller carriage 25 (Figs. 3, 4 and 5) comprises a plate 26 to the undersurface of which two laterally extending axles 27 and 28 are fixed by suitable bolts 29. A roller 30 is rotatably mounted on each end of each of the axles 27 and 28. The rollers 30 ride on the upper surfaces of lower flanges 31 and 32 of the channel members 17 and 18, respectively. A pair of depending plates 33 and 34 are fixed one to each of the opposite ends of the plate 26 and extend between the inner edges of the flanges 31 and 32 to maintain the roller carriage in correct alignment in the manner shown in Fig. 5. A stud 35 is fixed to the central portion of the plate 26 and projects downwardly therefrom. A saddle 36 is mounted on the threaded lower end of the stud 35 by a nut 37 and lock nut 38. The saddle 36 supports two laterally extending channel members 39 and 40 which are fastened together by suitable tie bolts 41 (Fig. 2) and held in proper spaced relation with each other by spacers 42 through which the bolts 41 extend.

As set forth above, the ends of the channel members 39 and 40, opposite to the runway 11, are supported by a similar roller carriage and saddle assembly 25 associated with the runway 12, whereby the channel members 39 and 40 may be moved longitudinally of the runways to accurately locate the channel members 39 and 40 beneath the rear axle of a vehicle supported on the runways regardless of the wheel base of said vehicle. In order to aid in such positioning, a pair of sleeves 42a are rotatably mounted one on each of the outermost spacers 42 and each of the sleeves 42a is provided with a radially extending pointer or handle 43 (Fig. 3) having an outer telescoping portion 44, whereby the member 43 may be rotated about the spacer 42 and the member 44 extended so that the tip thereof is adjacent the spindle of the rear axle of the vehicle in the manner illustrated in Fig. 1. The sleeve 42a is provided with a radially extending thumbscrew 45, whereby said sleeve may be locked in any radial position relative to the spacer 42 by tightening the thumbscrew 45 against said spacer.

The pointer 43 also permits the measurement of the distance between the front and rear axles of the vehicle by a single operator since one end of the measuring tape may be connected in a hole 44a at the outer end portion of the member 44 while the operator holds the other end of the tape adjacent the front axle and reads the indicia on the tape.

A pair of U-shaped jack supporting brackets 46 and 47 (Figs. 2 and 3) are supported on the channels 39 and 40. These brackets are identical and only the bracket 46 will be described in detail. The bracket 46 has a horizontal bottom portion 48 and two vertical side walls 49 and 50. Two outwardly projecting stub shafts 51 are fixed to the wall 49 adjacent the upper end thereof and similarly two outwardly projecting stub shafts 52 are fixed to the side wall 50 adjacent the upper end thereof. A roller 53 is rotatably mounted on each of the stub shafts 51 and a roller 54 is rotatably mounted on each of the stub shafts 52. The side walls 49 and 50 project upwardly between the channel members 39 and 40 and the rollers 53 and 54 ride on the upper surfaces, respectively, thereof, whereby the bracket 46 may be easily moved longitudinally of the channel members 39 and 40.

A hydraulic jack 55 is mounted on the lower horizontal portion 48 of the bracket 46 and a similar jack is mounted on the bracket 47. Each jack may be secured in any suitable manner, as by bolting, in a centered position in the bracket. The movable post 55a of the jack 55 is in the same vertical transverse plane as the outer end of the pointer 43 (Fig. 2) whereby, when the pointer 43 is aligned relatively to the end of the vehicle axle, the post 55a will automatically be positioned under the axle. A suitable handle 56 is provided which has a socket formed at one end for actuating the raising mechanism 57 and the release valve 58 of the jack 55. The other end of the jack handle 56 is turned to form a hook 59 which may be used to accurately position the brackets 46 and 47 relatively to the vehicle on the runways 11 and 12 by shifting the brackets along the channels 39 and 40.

From the foregoing description it may be seen that an assembly is provided which permits easy and accurate positioning of the jacks under the rear axle of a vehicle supported on the runways 11 and 12 by first moving the carriage 24 longitudinally of the runways until it is beneath the rear axle as indicated by the pointers 43 and then moving the brackets 46 and 47 laterally until the jacks supported thereon are accurately located beneath the vehicle. It is further evident that if the vehicle is slightly misaligned relatively to the aligning mechanism, the rear axle may be raised by the jacks on the brackets 46 and 47 until the wheels are clear of the runways 11 and 12 and then the rear of the vehicle may be moved sideways until the vehicle is properly aligned. The latter adjustment is made possible by the rollers 53 and 54 which support the brackets 46 and 47.

Having thus described my invention, what I claim as new and desire to protect by Letters Patent is:

1. For use with a pair of vehicle supporting runways each of which is provided with a pair of parallel horizontal flanges having spaced longitudinal edges defining a guide channel, a jack support comprising a pair of carriages each of which comprises a plate, a pair of axles extending transversely of said plate, a roller rotatably mounted on each of the opposite ends of each of said axles, said rollers being adapted to ride on the upper surfaces of said flanges, guide members fixed to each of the opposite ends of said plate and depending therefrom to project into the guide channel between said flanges and maintain said carriage in proper alignment relative to said flanges, a stud fixed to the central portion of the plate of each of said carriages and extending downwardly therefrom through said channel, a saddle fixed to the lower end of each of said studs, a pair of laterally extending parallel spaced frame members supported on said saddles, a U-shaped jack supporting bracket supported between said frame members, and rollers rotatably mounted on said bracket and adapted to ride on the upper surfaces of said frame members.

2. For use with a pair of vehicle runways each of which is provided with a pair of parallel flanges having laterally spaced longitudinal edges defining a guide channel, a jack support associated with said runways and comprising a pair of carriages each having a plate above a respective pair of said flanges and mounted on one of the runways for movement longitudinally thereof, a guide member fixed on each of said plates and projecting downward therefrom into the respective one of said guide channels between the associated pair of flanges, said guide members being arranged to maintain alignment of said carriages with said runway, a frame member connected to said carriage plates for movement with said carriages longitudinally of said runways, and a jack supported on said frame member for movement thereon transversely with respect to said runways.

3. For use with a pair of vehicle runways each of which is provided with a pair of parallel flanges having laterally spaced longitudinal edges defining a guide channel, a jack support associated with said runways and comprising a pair of carriages each having a plate above a respective pair of said flanges and mounted on one of the runways for movement longitudinally thereof, a guide member fixed at each end of each of said plates and projecting downward therefrom into the respective one of said guide channels between a pair of flanges and arranged to maintain alignment of the associated carriage with the associated runway, a frame member connected to said carriage plates for movement with said carriages longitudinally of said runways, and a jack supported on said frame member for movement thereon transversely with respect to said runways.

4. For use with a pair of vehicle runways each of which is provided with a pair of parallel flanges having laterally spaced longitudinal edges defining a guide channel, a jack support associated with said runways and comprising a pair of carriages each having a plate above the respective pair of said flanges, a guide member adjacent each end of each of said plates and projecting downward therefrom into the respective one of said guide channels between a pair of flanges and arranged to maintain alignment of the associated carriages with the respective one of said runways, rollers on said carriages movably mounting said carriages on said runway flanges, a frame member connected to said carriage plates for movement with said carriages longitudinally of said runways, and a jack supported on said frame member for movement thereon transversely with respect to said runways.

References Cited in the file of this patent

UNITED STATES PATENTS

| 2,229,113 | Mizer | Jan. 21, 1941 |

FOREIGN PATENTS

| 100,427 | Australia | Mar. 11, 1937 |
| 572,915 | Germany | Mar. 24, 1933 |